(12) United States Patent
Leposa

(10) Patent No.: US 9,162,812 B1
(45) Date of Patent: Oct. 20, 2015

(54) AEROSOL DRYING AGENT FOR OIL PAINTS

(75) Inventor: Christina M. Leposa, Strongsville, OH (US)

(73) Assignee: THE SHERWIN-WILLIAMS COMPANY, Cleveland, OH (US)

( * ) Notice: Subject to any disclaimer, the term of this patent is extended or adjusted under 35 U.S.C. 154(b) by 142 days.

(21) Appl. No.: 13/212,429

(22) Filed: Aug. 18, 2011

Related U.S. Application Data

(60) Provisional application No. 61/377,486, filed on Aug. 27, 2010.

(51) Int. Cl.
| | | |
|---|---|---|
| *C08L 33/06* | (2006.01) | |
| *B65D 83/14* | (2006.01) | |
| *C09D 5/02* | (2006.01) | |
| *C08K 5/05* | (2006.01) | |
| *C09D 133/06* | (2006.01) | |

(52) U.S. Cl.
CPC .............. *B65D 83/14* (2013.01); *B65D 83/752* (2013.01); *C08K 5/05* (2013.01); *C08L 33/06* (2013.01); *C09D 5/021* (2013.01); *C09D 133/06* (2013.01)

(58) Field of Classification Search
CPC ........ B65D 83/14; B65D 83/752; C08K 5/05; C08L 33/06; C09D 5/021; C09D 133/06; C09K 3/30
USPC ................. 524/556; 222/1, 402.1; 427/407.1, 427/421.1
See application file for complete search history.

(56) References Cited

U.S. PATENT DOCUMENTS 7,064,167 B2 * 6/2006 Redding ........................ 525/169
2011/0253754 A1 * 10/2011 Wyers ............................ 222/635

OTHER PUBLICATIONS

Marion-Boddy-Evans, "Oil Painting Techniques: Fat Over Lean," About.com, available at least as early as Jul. 7, 2010.
Oil Paint, Wikipedia, the free encyclopedia, available at least as early as Jul. 16, 2010.
Oil Painting, Wikipedia, the free encyclopedia, available at least as early as Jul. 16, 2010.
Oil Pastel, Wikipedia, the free encyclopedia, available at least as early as Jul. 22, 2010.
Paraloid B-67 (45%) Thermoplastic Solution Resin, The Dow Chemical Company, Jul. 1999.

\* cited by examiner

*Primary Examiner* — Peter D Mulcahy
*Assistant Examiner* — Marie Reddick
(74) *Attorney, Agent, or Firm* — Daniel A. Sherwin; James C. Scott; Vivien Y. Tsang

(57) ABSTRACT

An aerosol composition for facilitating drying of oil paintings comprises a solvent system, an acrylic binder, one or more drying agents, one or more anti-skinning agents; a UV absorber, a hindered amine light stabilizer, and a propellant. The aerosol composition is sprayed from an aerosol container onto an oil painting to aid in drying the top surface of the paint.

10 Claims, 1 Drawing Sheet

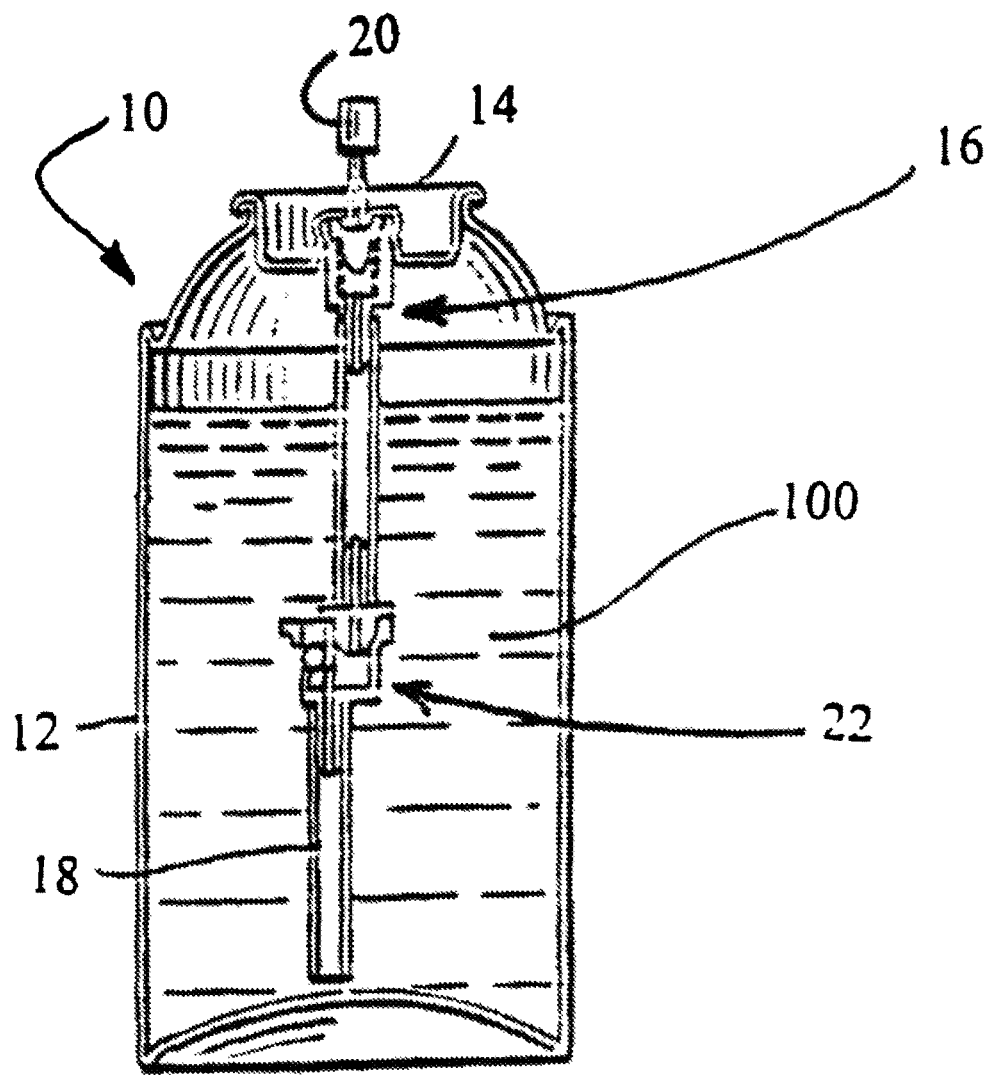

AEROSOL DRYING AGENT FOR OIL PAINTS

CROSS REFERENCE TO RELATED APPLICATION

This application claims the benefit of Provisional Application Ser. No. 61/377,486 filed Aug. 27, 2010.

BACKGROUND OF THE INVENTION

Oil painting is the process of painting with pigments that are suspended in an oil medium, typically linseed oil. Many artists using oil paints will paint on a canvas in layers. In one technique, an artist may apply several layers of paint using a technique known as "fat over lean." This means that each additional layer contains more oil (has more "fat") than the previous layer. This promotes proper drying of the layers of paint. In some cases, the artist may want the paint layers to blend with each other, while in others blending is not desirable. In any event, typically some drying of a paint layer must occur before another layer may be applied. While the oil paints will dry by themselves in time, often it is desirable to use an agent to help speed the drying process to allow the artist to continue working on the painting or when the work is finished. A similar process may be used for oil pastels, also called wax oil crayons. Oil pastels are typically comprised of pigment mixed with an oil and a wax binder.

BRIEF DESCRIPTION OF THE DRAWINGS

FIG. 1 shows a schematic view of an aerosol container charged with an aerosol composition embodied in accordance with the present invention.

DETAILED DESCRIPTION OF THE INVENTION

As used herein, the term "oil paints" refers to artist oil paints or oil pastels.

The present invention relates to an aerosol product which accelerates the oxidation process of oil paints to cause them to dry more quickly. The aerosol product may be sprayed on wet oil paints to achieve a desired level of drying to either continue with a painting or at the completion of the painting. The aerosol product may also be sprayed into oil paints to thin the paint and speed the drying process.

The aerosol product of the present invention comprises a mixture of a solvent system, binder polymer, drying agents, anti-skinning agents, UV absorbers/inhibitors, and hindered amine light stabilizers, and propellant.

The solvent system comprises at least one volatile organic solvent, more preferably a mixture of at least two volatile organic solvents. Volatile organic solvents that may be used in the solvent system include alcohols, such as methanol, ethanol, isopropanol, 2-butoxy ethanol, and n-butyl alcohol; ketones, such as acetone, methyl ethyl ketone, methyl propyl ketone, and methyl isobutyl ketone; propylene and ethylene glycol ethers and acetates; aliphatic and aromatic hydrocarbons and naphthas; petroleum and wood distillates; turpentine; mineral spirits; pine oil, and the like. Mixtures of the foregoing solvents may also be used and are in fact preferred. In one useful embodiment, the solvent system comprises mineral spirits, naphtha, and acetone.

The amount of the solvent system present in the aerosol composition is at least 20 weight percent of the total weight of the aerosol composition. In one useful embodiment, the amount of the solvent system present in the aerosol composition is from about 20 to about 50 weight percent, more preferably from about 25 to about 35 weight percent of the total weight of the aerosol composition.

In one useful embodiment, the binder polymer is an acrylic polymer. The acrylic portion is formed from monomers comprising at least one acrylic monomer and can be a homopolymer or a copolymer. Preferably, the acrylic portion is a copolymer formed from at least one acrylic monomer and a vinyl aromatic hydrocarbon, such as styrene, a methyl styrene or other lower alkyl styrene, chlorostyrene, vinyl toluene, vinyl naphthalene, or divinyl benzene. More preferably, the acrylic portion is formed from at least one acrylic monomer and vinyl toluene. Suitable acrylic monomers include any compounds having acrylic functionality, such as alkyl (meth) acrylates, acrylic acids, as well as aromatic derivatives of (meth)acrylic acid, acrylamides and acrylonitrile. Typically, the alkyl (meth)acrylate monomers (commonly referred to as "alkyl esters of (meth)acrylic acid") will have an alkyl ester portion containing from 1 to 12, preferably about 1 to 5, carbon atoms per molecule. Suitable acrylic monomers include, for example, methyl (meth)acrylate, ethyl (meth) acrylate, butyl (meth)acrylate, propyl (meth)acrylate, 2-ethyl hexyl (meth)acrylate, cyclohexyl (meth)acrylate, decyl (meth)acrylate, isodecyl (meth)acrylate, benzyl (meth)acrylate, isobornyl (meth)acrylate, neopentyl (meth)acrylate, 1-adamatyl methacrylate and various reaction products such as butyl, phenyl, and cresyl glycidyl ethers reacted with (meth)acrylic acid, hydroxyl alkyl (meth)acrylates, such as hydroxyethyl and hydroxypropyl (meth)acrylates, amino (meth)acrylates, as well as acrylic acids such as (meth)acrylic acid, ethacrylic acid, alpha-chloroacrylic acid, alpha-cycanoacrylic acid, crotonic acid, beta-acryloxy propionic acid, and beta-styryl acrylic acid. In one useful embodiment, the acrylic polymer is an isobutyl methacrylate polymer.

Various acrylic binder polymers are commercially available and may be useful in the present invention. For example, PARALOID B-67MT, which is a isobutyl methacrylate polymer in a 45% solids solution in mineral spirits. The aerosol composition may comprise at least about 4% to about 15% by weight of the binder polymer.

Anti-skinning agents that may be used include methyl ethyl ketoxime, o-cresol, and hydroquinone. The aerosol composition of the present invention may comprise about 2% to about 3% by weight of one or more anti-skinning agents.

Drying agents may comprise standard metallic and rare earth driers such as cobalt, calcium, potassium, lithium, barium, zinc, manganese, tin, aluminum, bismuth, zirconium strontium and vanadium napthenates, octoates, hexanates, and isodecanoates. Another useful drying agent is 2,2 Bipyridine. Many useful drying agents are commercially available and typically comprise the metallic element dissolved in various solvents. The aerosol composition of the present invention may comprise about 20% to about 25% by weight of one or more drying agents. In one embodiment, the aerosol composition comprises a drying agent package comprising two or more drying agents. In one useful embodiment, the drying agent package comprises about 60% to about 70% of a calcium containing drying agent, about 30% to about 40% of a zirconium containing drying agent, and about 0.5% to about 25 of 2,2 Bipyridine. In another useful embodiment, clear, colorless drying agents are used in the drying agent package.

The aerosol composition of the present invention is formed by combining the binder, solvent system, anti-skinning agents, drying agents, UV absorbers and hindered amine light stabilizers and then aerosolizing the combination with the propellant.

The propellant is a liquafiable gas having a vapor pressure sufficient to propel the aerosol paint composition from the container. In one useful embodiment, the propellant is selected from the group consisting of ethers, such as dimethyl ether (DME) and diethyl ether, C1-C4 saturated hydrocarbons, such as methane, ethane, propane, n-butane, and isobutane; hydrofluorocarbons (HFC), such as 1,1,1,2-tetrafluoroethane (HFC-134a), 1,1,1,2,3,3,3,-heptafluoropropane (HFC-227HFC), difluoromethane (HFC-32), 1,1,1-trifluoroethane (HFC-143a), 1,1,2,2-tetrafluoroethane (HFC-134), and 1,1-difluoroethane (HFC-152a); and mixtures of the foregoing.

The amount of the propellant present in the aerosol composition is typically at least 10 weight percent and preferably from about 10 to about 40 weight percent, more preferably from about 20 to about 30 weight percent of the total weight of the aerosol composition.

In one useful embodiment, the solvent-borne aerosol composition of the present invention is made in a batch process at or below a temperature of 70° F. The components of the aerosol composition, except the propellant are mixed with an air mixer. The resulting composition is filtered through a 10 micron filter bag to remove any large agglomerations. The composition is then added to a container, such as container 10 shown in FIG. 1, and then the propellant is added to form the aerosol composition.

Referring now to FIG. 1, the container 10 comprises a can 12, to which a valve cup 14 is secured. A valve assembly 16 with a dip tube 18 connected thereto is secured to the valve cup 14. The dip tube 18 extends into the interior of the can 12 and is in contact with the aerosol paint composition, which is designated by the numeral 100. The can 12 may be composed of aluminum or more preferably tin plated steel. The valve cup 14 may be sealed to the can 12 and the propellant charged through the valve assembly 16, or the can 12 may be charged with the propellant under the valve cup 14, and then the valve cup 14 sealed to the can 12. An actuator 20 is then connected to the valve assembly 16.

Various valves, dip tubes and actuators may be used to spray the aerosol paint composition. Preferably, the dip tube 18 is a standard dip tube having a diameter of about 0.147 inches. The valve assembly 16 may be either a "female" aerosol valve or a "male" aerosol valve. Examples of "female" aerosol valves that may be used in the present invention are disclosed in U.S. Pat. Nos. 3,033,473; 3,061,203; 3,074,601; 3,209,960; and 5,027,985. Examples of "male" aerosol valves that may be used in the present invention are disclosed in U.S. Pat. Nos. 2,631,814, and 4,572,406. Preferably, the valve assembly 16 is a "female" valve with a spray controller 22 having a construction as disclosed in U.S. Pat. No. 4,572,406, which is hereby incorporated by reference. The spray controller 22 permits the aerosol paint composition 100 to be dispensed when the container 10 is inverted.

The invention will be better understood by reference to the following example:

EXAMPLE 1

A batch of the inventive solvent-borne paint composition was formed in a mixing vessel. The batch was formed from the following components in the noted amounts, where parts are parts by weight.
Binder[1] 10.78 parts
Mineral spirits 12.70 parts
UV Absorber/hindered amine light stabilizer[2] 0.46 parts
Drying agent[3] 15.31 parts
Drying agent[4] 7.87 parts
Drying agent[5] 0.28 parts
Anti-skinning agent[6] 2.60 parts
VM&P naphtha 10.00 parts
Acetone 10.00 parts

[1] Paraloid B-67 MT (45% solids in mineral spirits) from Dow
[2] Tinuvin 5350 from BASF
[3] 10% Calcium Cem-All from OM Group
[4] 18% Zirconium from OM Group
[5] DRI-RX HF from OM Group
[6] Skino from OM Group The above composition was charged to an aerosol container composed of tin-plated steel and pressurized with 30 parts by weight of a NP70 hydrocarbon propellant to form the aerosol composition.

The aerosol composition of the present invention can be used at various times during the process of creating a work using oil paints. In use, the artist will shake the can then apply the aerosol composition to oil paint applied to a substrate. The paint can be used to completely or partially dry a layer of oil paint depending on the desired artistic effect, e.g. blended paint layers or applying one layer over another without blending. In addition, the aerosol composition of the present invention may be sprayed directly into wet oil paints to thin the paint and to cause it to dry more quickly once applied. In another useful embodiment, the aerosol composition may be applied to the finished painting to dry the top surface of the paint to allow the work to be transported.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. An aerosol coating product comprising:
    (a) a container comprising a can, a valve cup with a valve assembly, a dip tube and an actuator; and
    (b) an aerosol coating composition disposed within said container, said aerosol coating composition comprising:
        (i) an acrylic polymer binder;
        (ii) a drying agent package, said drying agent package comprising a calcium containing drying agent, a zirconium containing drying agent, and 2,2-bipyridine;
        (iii) an anti-skinning agent;
        (iv) a solvent system;
        (v) a UV absorber;
        (vi) a hindered amine light stabilizer; and
        (vii) an aerosol propellant;
    wherein the aerosol coating composition is used to facilitate drying of artists oil paints applied to a substrate.

2. The aerosol coating product of claim 1, wherein the acrylic polymer binder is an isobutyl methacrylate polymer.

3. The aerosol coating product of claim 1, wherein the anti-skinning agent is methyl ethyl ketoxime.

4. The aerosol coating product of claim 1, wherein the solvent system comprises mineral spirits, VM&P naphtha, and acetone.

5. The aerosol coating product of claim 1 wherein the aerosol propellant is selected from the group consisting of dimethyl ether, diethyl ether, C1-C4 saturated hydrocarbons, hydrofluorocarbons, heptafluoropropane, difluoromethane, 1,1,1-trifluoroethane, 1,1,2,2-tetrafluoroethane, and 1,1-difluoroethane, and mixtures thereof.

6. The aerosol coating product of claim 1, wherein the aerosol coating composition comprises about 20% to about 50% by weight of the solvent system.

7. The aerosol coating product of claim 1, wherein the aerosol coating composition comprises about 4% to about 15% by weight of the acrylic polymer binder.

8. The aerosol coating product of claim 1, wherein the aerosol coating composition comprises about 2% to about 3% by weight of the anti-skinning agent.

9. The aerosol coating product of claim 1, wherein the aerosol coating composition comprises about 20% to about 25% by weight of the drying agent package.

10. A method for creating an oil painting comprising:
   (a) applying oil paint to a surface;
   (b) providing an aerosol coating product comprising (i) a container comprising a can, a valve cup with a valve assembly, a dip tube and an actuator and (ii) an aerosol coating composition disposed within said container said aerosol coating composition comprising:
   (A) an acrylic polymer binder;
   (B) a drying agent package, said drying agent package comprising a calcium containing drying agent, a zirconium containing drying agent, and 2,2-bipyridine;
   (C) an anti-skinning agent;
   (D) a solvent system;
   (E) a UV absorber;
   (F) a hindered amine light stabilizer; and
   (G) an aerosol propellant;
   (c) spraying said aerosol coating composition onto said oil paint applied to said surface.

\* \* \* \* \*